Patented Feb. 20, 1945

2,369,693

UNITED STATES PATENT OFFICE 2,369,693

REVIVIFICATION OF SPENT PHOSPHATE CATALYSTS

Richard C. Tollefson, Stamford, Conn., assignor to Air Reduction Company, Incorporated, New York, N. Y., a corporation of New York No Drawing. Application April 26, 1943, Serial No. 484,676

8 Claims. (Cl. 252—242)

This invention relates to the production of 1,3-butadiene from 1,3-butylene glycol and particularly to an improved method of revivifying catalysts employed in the procedure.

1,3-butadiene is derived from 1,3-butylene glycol by splitting off water in accordance with the following reaction:

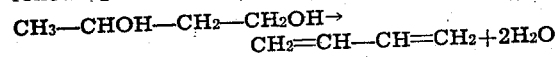

Procedures involving dehydration of 1,3-butylene glycol in the presence of various catalysts have been suggested heretofore. Catalysts consisting of phosphates of calcium or sodium may be utilized. An improved method for accomplishing the desired result is described in the application of Arthur E. Lorch, Serial No. 483,343, filed April 16, 1943, in which the preferred catalyst is "ammonium phosphate."

Phosphate catalysts employed in the procedure are subject to deterioration. Such catalysts contain more or less free phosphoric acid. Among the causes of deterioration are the formation of carbonaceous deposits resulting presumably from the action of free phosphoric acid on the 1,3-butylene glycol. Heretofore, attempts have been made to revivify such catalysts by heating them in the presence to relatively high temperatures in the presence of air or oxygen, with the object of burning the carbonaceous deposits. In many cases, such treatment fails to restore the catalytic activity and in fact may destroy the catalyst.

It is the object of the present invention to provide a simple and effective method for the treatment of spent phosphate catalysts whereby their initial activity may be revivified with a minimum of expense and effort.

Other objects and advantages of the invention will be apparent as it is better understood by reference to the following specification, in which the preferred embodiments of the invention are described.

While the invention is not limited to the precise procedure and to the catalyst described in the application of Arthur E. Lorch above identified, its advantages may be well illustrated by reference to this procedure.

In the method as described in application Serial No. 483,343, dehydration is carried out in the vapor phase. To permit such operation, the catalyst, mounted on a suitable carrier, preferably one composed essentially of silica, such as a calcined diatomaceous earth known as "Celite V" or silica bonded with feldspar is disposed in a suitable chamber maintained at a temperature ranging from 220° to 400° C., and preferably within the range of approximately 280° to 320° C. The temperature may be maintained by employing a suitable jacket about the chamber and circulating a heating liquid such for example as "Dowtherm" therethrough. The glycol is introduced to the chamber and passed over the catalyst bed, which effects the desired dehydration.

As a catalyst, "ammonium phosphate" is preferred. The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resultant salt or salts in the catalyst mass at the temperature maintained cannot be determined accurately. Any of the phosphates mentioned or the resulting products are active catalysts for the reaction. "Ammonium phosphate" is markedly superior to phosphate catalysts which have been mentioned heretofore in the literature concerning dehydration of 1,3-butylene glycol, such for example as calcium phosphate and acid sodium phosphate. The latter catalysts are, however, amenable to the treatment hereinafter described to restore catalytic properties after deterioration in use.

I have discovered that the revivification of spent phosphate catalysts of the type described can be markedly improved by the introduction of ammonia with the air or oxygen which is employed to burn off carbonaceous deposits in the spent catalyst. While the reason for this behavior is not positively known and I do not wish to be limited to any particular theory, it is believed that the ammonia may combine temporarily with any free phosphoric acid present or it may repress the formation of free phosphoric acid at the elevated temperatures employed. In any event, the procedure may be employed satisfactorily either before or after addition of fresh phosphoric acid to the catalyst. The presence of ammonia evidently prevents the loss of free phosphoric acid from the catalyst during the revivification procedure.

The procedure in general is as follows. Air, saturated with water vapor at 70°–80° C., and containing added ammonia, preferably between 5% and 25% of NH₃ by volume, is passed over the spent catalyst at a temperature of 300°–450° C. The time required for burning off depends upon the amount of carbonaceous matter to be removed and the temperature at which the burning proceeds. The operation may be continued until the carbonaceous matter has been eliminated.

The ammonia may be introduced by vaporizing the requisite amount of commercial aqueous ammonia or by the addition of anhydrous ammonia, the ammoniacal vapors being mixed with the air or oxygen before it is brought into contact with the spent catalyst. The beneficial effects from the use of ammonia during revivification can be best shown with catalysts which have considerable activity, since it is obvious that the use of ammonia in burning off a catalyst which has lost its activity because of reasons other than the deposition of carbon will in no wise restore the activity of the spent catalyst.

Any suitable apparatus may be employed to heat the catalyst to a suitable temperature and to maintain the flow of air or oxygen containing the requisite proportion of ammonia in contact with the heated catalyst. Advantageously, the burning off of the catalyst may be carried out in the chamber in which the catalyst is used to dehydrate glycol as in the Lorch application above identified. However, the apparatus forms no part of the present invention, and consequently need not be illustrated and described in detail.

As an example of the inefficacy of the procedure heretofore employed, a catalyst composed of 70% Celite V and 30% ammonium phosphate was found to have sufficient activity to dehydrate 1,3-butylene glycol to 1,3-butadiene at a temperature of 300° to 320° C. with a conversion of 84% decreasing after three days to 72%. The resulting butadiene had a purity of 89%–92%.

A portion of such catalyst was subjected to the usual treatment by burning off with air saturated with water vapor at 70°–80° C., which was passed over the catalyst at 380°–400° C. for two days. The catalyst was then employed in the dehydration of 1,3-butylene glycol. The conversion to 1,3-butadiene was found to be 66%, decreasing after three days to 34%. The purity of the butadiene ranged from 84% to 90%.

Another portion of the initial catalyst was burned off in accordance with the present invention, using 0.1 cubic foot of ammonia for each cubic foot of air passed over the catalyst. The conditions of revivification were otherwise the same. When the resulting catalyst was employed in the dehydration of 1,3-butylene glycol, the initial conversion was 76%, decreasing at the end of three days to 44%, while the purity of the butadiene varied from 91% to 92%. The results clearly indicate the advantages of employing ammonia in the procedure.

Various changes may be made in the details of operation as hereinbefore described, as well as in the apparatus employed, without departing from the invention or sacrificing any of the advantages thereof.

I claim:

1. The method of removing carbonaceous deposits from spent phosphate catalysts employed in the dehydration of 1,3-butylene glycol which comprises heating the catalyst in the presence of oxygen and ammonia at a temperature sufficient to effect combustion of the carbon with the oxygen.

2. The method of removing carbonaceous deposits from spent phosphate catalysts employed in the dehydration of 1,3-butylene glycol which comprises heating the catalyst in a mixture of air and ammonia at a temperature sufficient to effect combustion of the carbon with the oxygen.

3. The method of removing carbonaceous deposits from spent phosphate catalysts employed in the dehydration of 1,3-butylene glycol which comprises heating the catalyst in a mixture of air saturated with water vapor at 70°–80° C. and ammonia at a temperature sufficient to effect combustion of the carbon with the oxygen.

4. The method of removing carbonaceous deposits from spent phosphate catalysts employed in the dehydration of 1,3-butylene glycol which comprises heating the catalyst in a mixture of air and 5% to 25% by volume of ammonia at a temperature sufficient to effect combustion of the carbon with the oxygen.

5. The method of removing carbonaceous deposits from spent phosphate catalysts employed in the dehydration of 1,3-butylene glycol which comprises heating the catalyst in the presence of oxygen and ammonia at a temperature of 300°–450° C.

6. The method of removing carbonaceous deposits from spent phosphate catalysts employed in the dehydration of 1,3-butylene glycol which comprises heating the catalyst in a mixture of air and ammonia at a temperature of 300°–450° C.

7. The method of removing carbonaceous deposits from spent phosphate catalysts employed in the dehydration of 1,3-butylene glycol which comprises heating the catalyst in a mixture of air saturated with water vapor at 70°–80° C. and ammonia at a temperature of 300°–450° C.

8. The method of removing carbonaceous deposits from spent phosphate catalysts employed in the dehydration of 1,3-butylene glycol which comprises heating the catalyst in a mixture of air and 5% to 25% by volume of ammonia at a temperature of 300°–450° C.

RICHARD C. TOLLEFSON.